United States Patent [19]

Matsuoka

[11] 3,727,893
[45] Apr. 17, 1973

[54] APPARATUS FOR PROCESSING RUBBER, PLASTIC AND THE LIKE AND PARTS THEREOF

[75] Inventor: James T. Matsuoka, Brecksville, Ohio

[73] Assignee: Intercole Automation, Inc., Cleveland, Ohio

[22] Filed: July 19, 1971

[21] Appl. No.: 163,918

[52] U.S. Cl. .......................259/109, 277/74, 277/88
[51] Int. Cl. ...............................................B01f 7/02
[58] Field of Search.......................277/93, 74, 75, 72; 259/109, 5–10, 16, 21–26, 32–35, 40–46, 64–69

[56] References Cited

UNITED STATES PATENTS

| | | | |
|---|---|---|---|
| 3,318,604 | 5/1967 | Tracy | 277/74 X |
| 3,540,742 | 11/1970 | Tracy | 277/75 X |
| 3,582,089 | 6/1971 | Amorese | 277/74 X |

*Primary Examiner*—G. V. Larkin
*Attorney*—Watts, Hoffmann, Fisher & Heinke

[57] ABSTRACT

Apparatus for processing rubbers, plastics, other elastomers, and the like, including a rotatable material processing member having a processing portion within a material processing chamber and supporting shaft portions extending through end walls of the chamber and a seal having a water-cooled wear ring for preventing the leakage of material from the mixing chamber around the shaft portions of the rotors extending through the end walls of the mixing chamber.

4 Claims, 9 Drawing Figures

INVENTOR.
JAMES T. MATSUOKA

BY *Watts, Hoffmann, Fisher & Heinke*
ATTORNEYS

APPARATUS FOR PROCESSING RUBBER, PLASTIC AND THE LIKE AND PARTS THEREOF

BACKGROUND OF INVENTION

1. Field of Invention

The invention relates to apparatus of the enclosed bladed rotor-type for blending, mixing and/or other processing of plastics, rubbers, elastomers, and other like material, included in the class of apparatus sometimes referred to as vulcanizable rubber apparatus.

2. Description of Prior Art

Apparatus for blending and otherwise processing rubbers, plastics and like materials in a closed chamber by a bladed rotatable member is well known. Exemplifications of such apparatus are disclosed in Applicant's prior patents including U. S. Pat. Nos. 3,403,864 and 3,558,106.

Such apparatus commonly includes some type of seal to prevent the leakage of material from the mixing chamber around the shaft portions of the processing rotors which extend therethrough. In some instances such seals comprise metal members biased into engagement with one another. The processing is usually carried out at elevated temperatures and the material is usually highly susceptible to contamination by foreign materials, such as, lubricating oils, etc. The aforementioned and other factors make it difficult to prevent leakage about the mixing chamber where the shaft portions of the rotor or rotors extend through the walls thereof. Because the material being processed typically solidifies upon cooling, temperature control of the seals is important and such control heretofore has not been entirely satisfactory resulting in extremely short life, etc. of the seals and in excessive down time and high maintenance costs of the apparatus.

SUMMARY OF THE INVENTION

The present invention provides a processing machine particularly adapted for blending, mixing and/or other processing of plastics, rubbers, elastomers and the like, having a rotor provided with a bladed processing portion within a processing chamber and shaft portions extending through the end walls of the chamber and seal means for preventing the leakage of material from the chamber about the shaft extensions comprising a water-cooled wear ring connected to the exterior of the end wall of the mixing chamber and having a radial portion facing the mixing chamber engaged by a second ring-like member biased into engagement therewith.

DESCRIPTION OF PREFERRED EMBODIMENT

Figure 1:
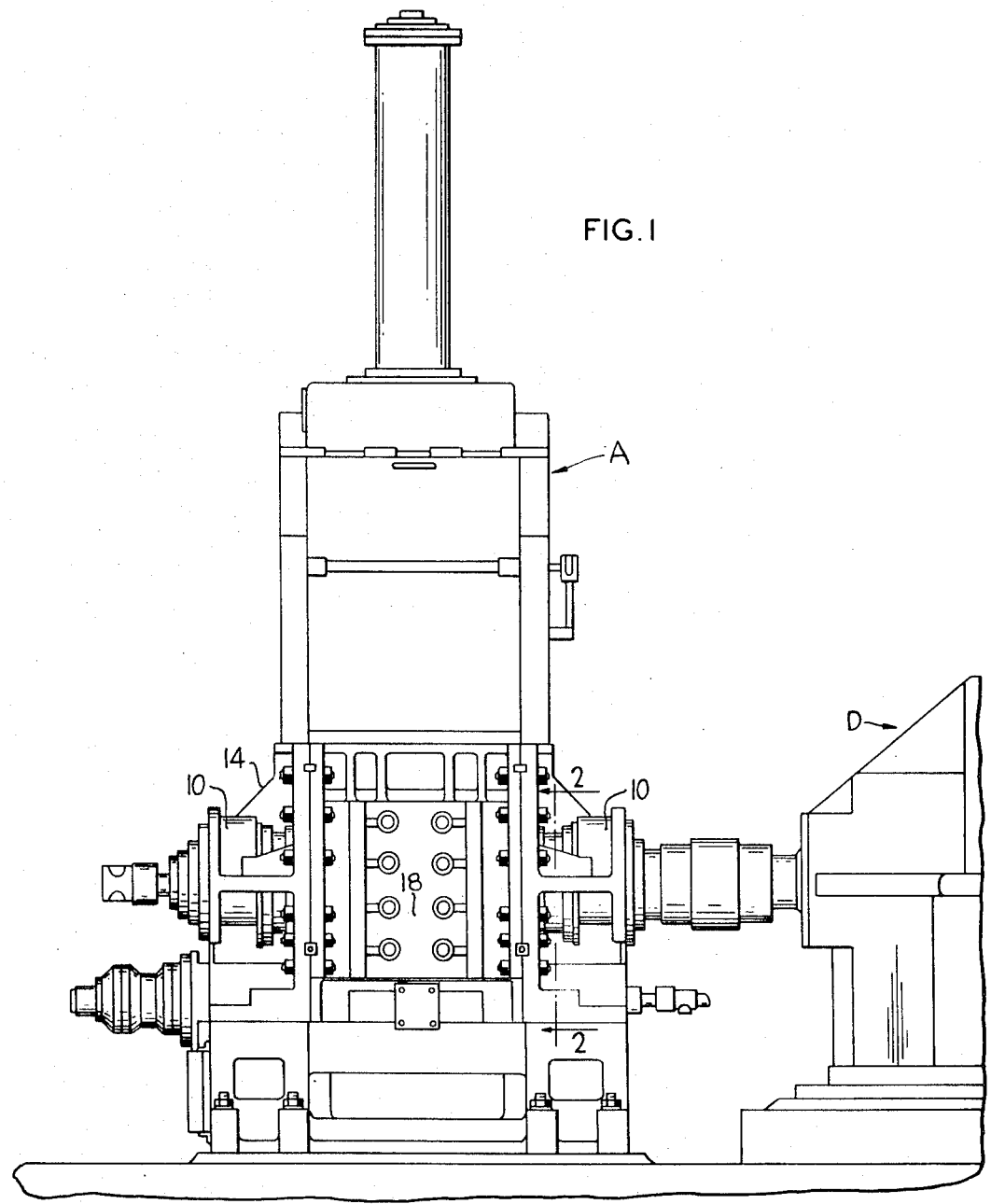
FIG. 1 is a fragmentary front elevational view of an apparatus embodying the present invention.
Figure 2:
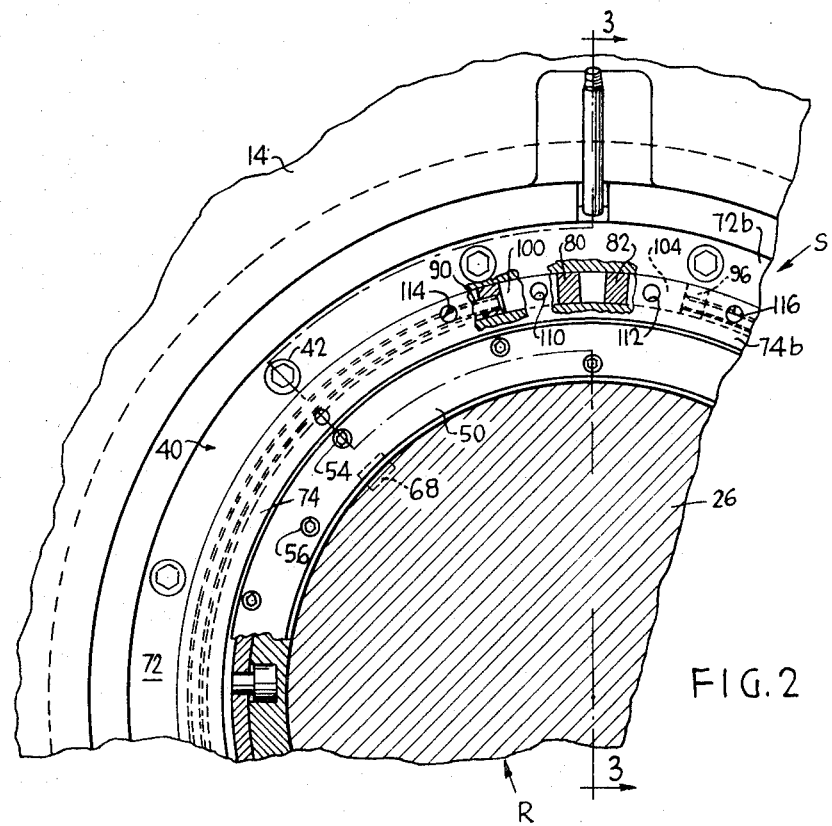
FIG. 2 is a fragmentary sectional view with parts in elevation approximately on the line 2—2 of FIG. 1.
Figure 3:
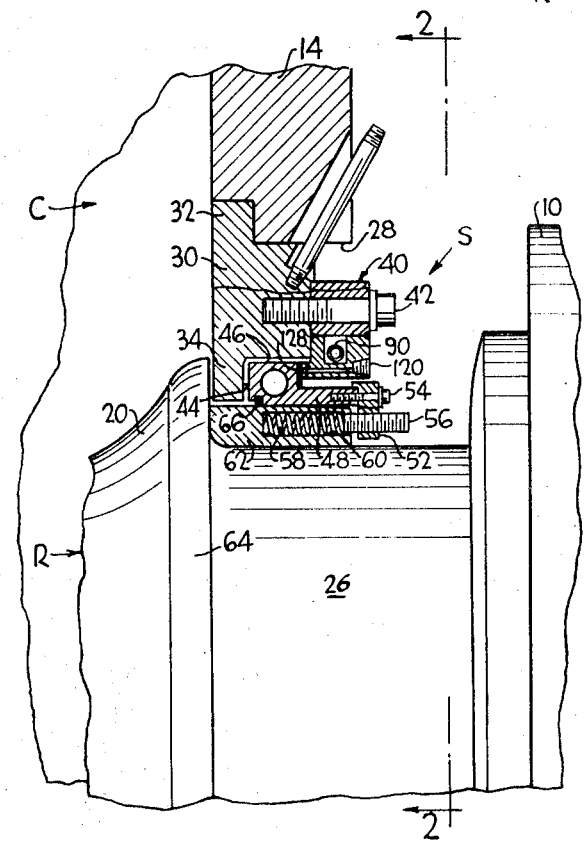
FIG. 3 is a fragmentary sectional view with parts in elevation approximately on the line 3—3 of FIG. 2.
Figure 4:
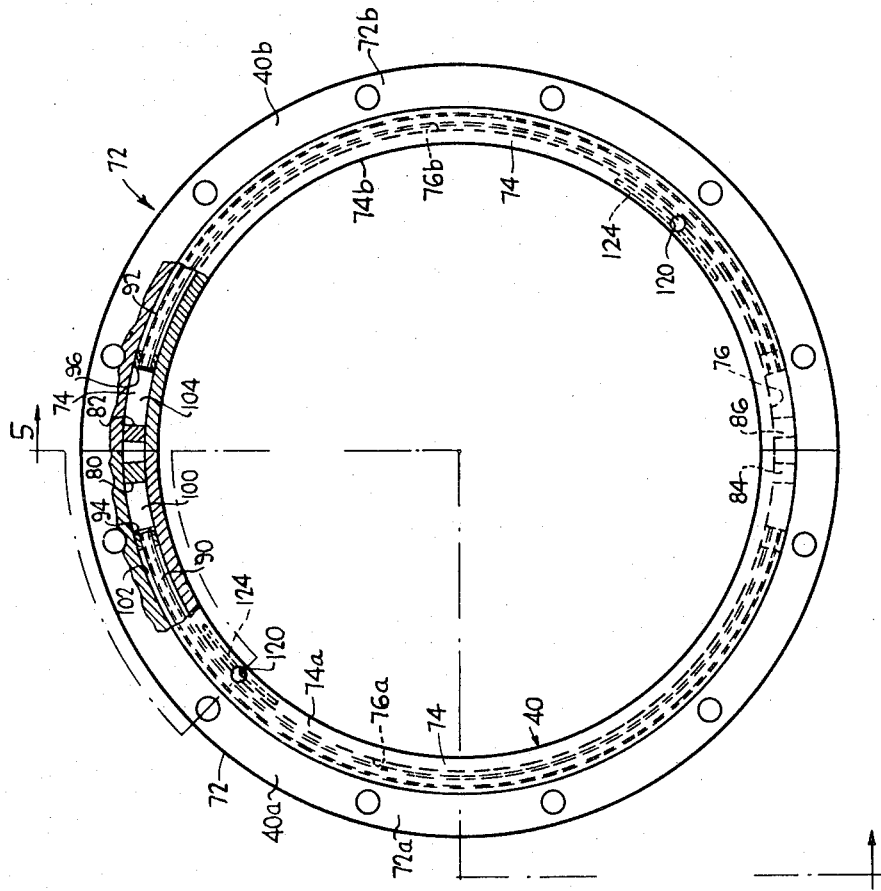
FIG. 4 is a side elevational view, with parts broken away to better show the construction, of the stationary wear ring.
Figure 6:
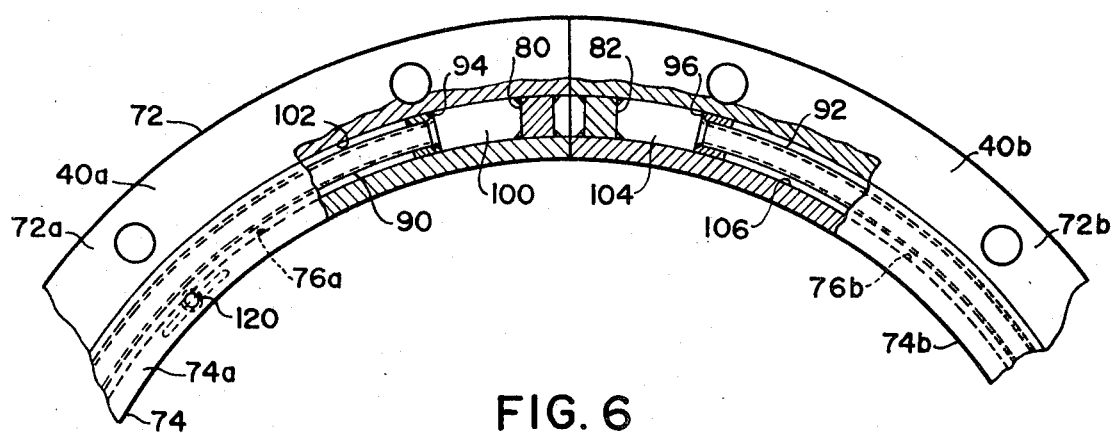
Figure 7:
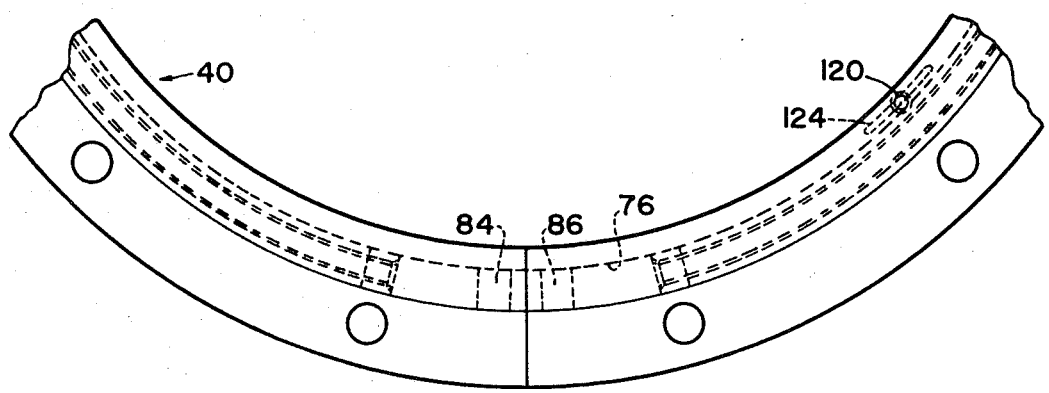
Figure 8:
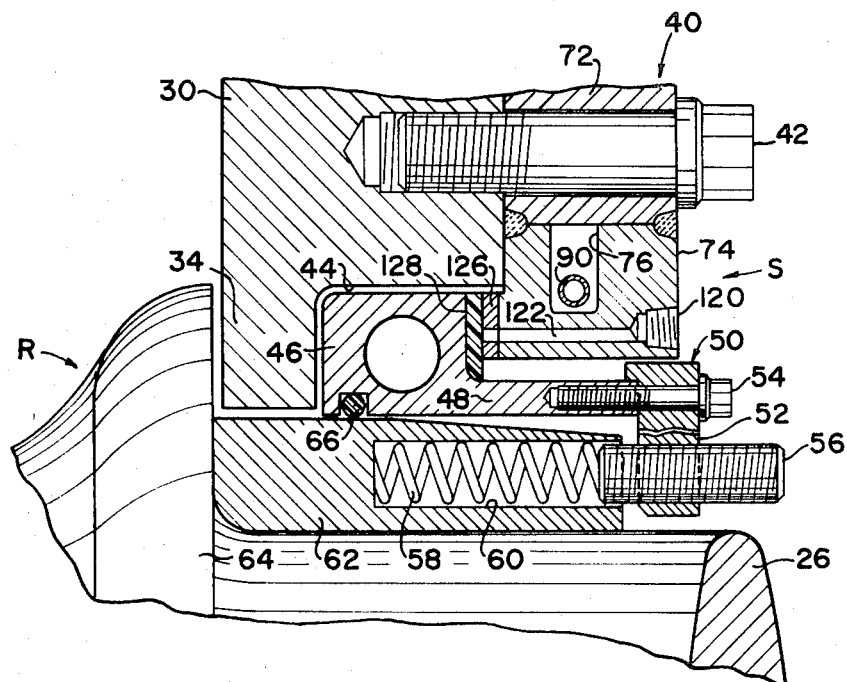

FIG. 6 is an enlarged view of the upper portion of FIG. 4;

FIG. 7 is an enlarged view of the lower portion of FIG. 4;

FIG. 8 is an enlarged view of a portion of FIG. 3; and

Figure 5:
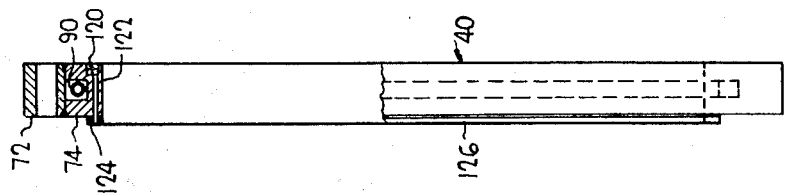
FIG. 5 is a view approximately on the line 5–5 of FIG. 4.
Figure 9:
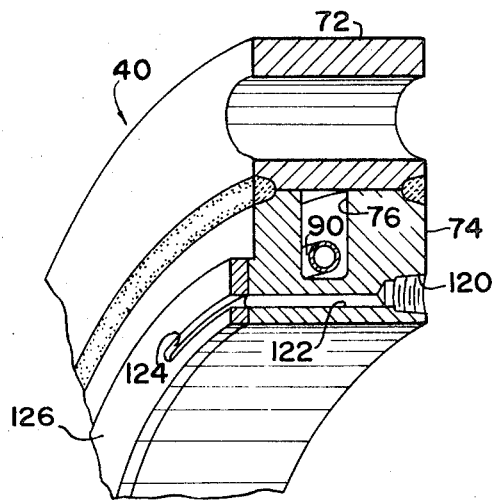

FIG. 9 is a fragmentary perspective view of the upper part of FIG. 5.

The processing machine shown in the drawings and designated generally by the reference character A is similar to that shown in U.S. Pat. No. 3,558,106 and only those parts of the apparatus which are necessary for an understanding of the present invention are shown in the drawings and described in detail.

The apparatus A comprises two side-by-side rotors R, only one of which appears in the drawings, supported in suitable bearing means 10 in end frame members 14 detachably connected to front and rear side frame members 18. The end and side frame members form a material processing chamber C within which bladed processing portions 20 of the rotors are located. The rotors are suitably driven in opposite directions by drive means designated generally by the reference character D. Shaft portions 26 of the rotors extend through openings 28 in the end members 10 and each opening is provided with seal means designated generally by the reference character S for preventing the leakage of material from the processing chamber through the end frame members about the shaft portions.

The seals S are alike and each comprises a ring-like member 30 having external and internal flanges 32, 34, respectively. The member 30 is welded or otherwise suitably secured within one of the annular openings 28 in the end frame members such that one radial face of the member 30 forms a portion of the interior wall of the mixing chamber. The other or external radial face of the member 30 has a stationary wear ring assembly 40 detachably secured thereto as by machine screws 42. The assembly 40 extends radially inwardly beyond the internal face of the member 30 and with the internal flange 34 of the member 30 forms an internal groove 44 within which projects an external flange 46 of a rotatable member 48 forming part of a rotatable wear ring assembly 50.

In addition to the member 48, the assembly 50 includes an annular member 52 secured to the outer or right-hand end of the member 48, as viewed in FIG. 3 of the drawings, by machine screws 54. The member 52 extends radially inwardly beyond the inner wall of the member 48 to a position closely adjacent but spaced from the shaft section 26 of the rotor, and carries a plurality of members 56 threaded into suitable tapped apertures, the inner or left-hand ends of which engage compression springs 58 located in axial bores 60 in an annular member 62 on the shaft portion 26 of the rotor interposed between the member 52 and a flange 64 on the rotor immediately adjacent but slightly spaced from the adjacent inner end wall of the mixing chamber C. The construction is such that a small clearance is provided between the member 30 and the members 48 and 62 and the flange 46. An O-ring 66 in an internal groove in the member 48 adjacent its left-hand end prevents the leakage or escape of material from the mixing chamber between the interior of the member 48 and the exterior of the member 62. The assembly 50 and the member 62 are slidably keyed to the shaft section 26 of the rotor in a suitable manner as by a key 68 so that they rotate with the rotor.

For the purpose of facilitating manufacture the assembly 40 is constructed of two annular members 72, 74, the latter being located radially within the former and fixedly secured together as by welding. For the purpose of facilitating assembly the assembly 40 is made in two semi-circular parts 40a and 40b, see FIG. 4. More specifically, the assembly 40 is split on the vertical centerline, as viewed in FIG. 4.

Prior to assembly of the members 72, 74, the inner member 74 is provided with an external annular groove 76, half of which is in each of the two parts 74a, 74b of the member 74. The upper adjoining ends of the semi-circular grooves 76a, 76b of the groove 76, as viewed in FIG. 4, are blocked or closed by members 80, 82, respectively, welded therein. The members 80, 82 are slightly spaced from one another but this is merely a manufacturing facility. The opposite ends of the semi-circular grooves 76a, 76b are similarly blocked by members 84, 86. Each of the semi-circular grooves 76a, 76b, has a substantially semi-circular tubular member 90, 92, therein. The tubular members 90, 92 are fixedly secured in suitable apertures in members 94, 96, at the top of the assembly 40, as viewed in FIG. 5, and welded in place in the respective portions 76a, 76b of the groove 76 in the member 74 adjacent to but spaced at opposite sides of the members 80, 82, respectively. The members 94, 96 divide the grooves 76a, 76b into two chambers 100, 102 and 104, 106, respectively. The chambers 100 and 104 are relatively small and are between the members 80, 94 and 82, 96, respectively, and the chambers 102 and 106 are relatively large extending from the member 94 to the member 84 and from the member 96 to the member 86, respectively.

For purposes of cooling the wear ring assembly 40, a water inlet connection of each of the chambers 100, 104 is provided in the form of tapped apertures 110, 112 in the right-hand wall of the member 74, the inner ends of which communicate with the chambers 100, 104, respectively. Water entering the chambers 100, 104 through the openings 110, 112 is circulated through the tubes 90, 92 to the lower ends of the grooves 76a, 76b, as viewed in FIG. 4, from which position it returns in the groove 76a, 76b along the exterior of the tubes 90, 92 to outlets at the top of the assembly in the form of a tapped aperture 114, 116 in the right-hand wall of the member 74 and communicating with the grooves 76a, 76b at a point adjacent to the members 94, 96, respectively.

The reference character 120 designates tapped apertures in the inner member 74 of the assembly 40 communicating through suitable openings 122 with short arcuate grooves 124 in an annular bearing member 126 carried by the assembly 40. The axial facing left-hand radial surface of the member 126 is engaged by an axial facing radial surface on the right-hand side of an annular bearing member 128 carried by the member 48. The bearing members 126, 128 are made of suitable metallic bearing material and are fixedly connected to the parts 74, 48, respectively, in a suitable manner. Lubricant is supplied to engage surfaces of the bearing members 126, 128 through the apertures 120, etc. The bearing members serve bearing, wearing and seal functions. The pipe 130 is used to supply processing oil to the space between the members 30 and the part 46 of the member 48.

From the foregoing disclosure including a detailed showing and description of the preferred embodiment of the invention, it will be apparent that the invention provides a processing machine particularly adapted for processing plastics, rubbers, elastomers and the like, the shaft projections of the rotors of which are sealed by means including a water-cooled wear ring.

While the preferred embodiment of the invention has been described in considerable detail, it is to be understood that the invention is not limited to the particular apparatus shown and it is the intention to hereby cover all adaptations, modifications and uses thereof which come within the scope of the appended claims.

Having thus described my invention, what I claim is:

1. In apparatus for processing rubber, plastic, and the like, a housing having a material processing chamber, a rotor having a material processing blade in the processing chamber with at least one end of the rotor extending outwardly of the processing chamber through an opening in the housing, a seal for preventing leakage or escape of material being processed between the housing and the extension of the rotor through the opening in the housing comprising: two concentric ring-like assemblies for closing the opening in the housing surrounding the rotor, one being orientated radially inwardly of the other; means for securing the outer of said ring-like assemblies to the housing; means for securing the inner of said ring-like assemblies to the rotor; said inner of said ring-like assemblies having a radial surface slidably engaging a radial surface on said outer of said ring-like assemblies; means biasing said radial surface on said inner of said ring-like assemblies into engagement with said radial surface on said outer of said ring-like assemblies; and means for circulating a heat exchange fluid through at least a portion of said outer of said ring-like assemblies.

2. In apparatus for processing rubber, plastic, and the like, a housing providing a material processing chamber, a rotor having a material processing blade in the processing chamber with at least one end extending outwardly of the processing chamber through an opening in the housing, a seal for preventing leakage or escape of material being processed between the housing and the extension of the rotor through the opening in the housing comprising: two concentric ring-like assemblies for closing the opening in the housing surrounding the rotor, one being orientated radially inwardly of the other; means for securing the outer of said ring-like assemblies to the housing; means for securing the inner of said ring-like assemblies to the rotor; said inner of said ring-like assemblies having a radial surface facing away from the mixing chamber slidably engaging a radial surface on said outer of said ring-like assemblies; means biasing said radial surface on said inner of said ring-like assemblies into engagement with said radial surface on said outer of said ring-like assemblies; and means for circulating a heat exchange fluid through at least a portion of said outer of said ring-like assemblies.

3. In apparatus for processing rubber, plastic, and the like, a housing providing a material processing chamber, a rotor having a material processing blade in the processing chamber with at least one end extending outwardly of the processing chamber through an opening in the housing, a seal for preventing leakage or escape of material being processed between the housing and the extension of the rotor through the opening in the housing comprising: two concentric ring-like assemblies for closing the opening in the housing surrounding the rotor, one being orientated radially inwardly of the other; the outer of said ring-like assemblies comprising at least two arcuate parts, means for securing said parts of said outer of said ring-like assemblies to the housing; means for securing the inner of said ring-like assemblies to the rotor; said inner of said ring-like assemblies having a radial surface slidably engaging a radial surface on said outer of said ring-like assemblies; means biasing said radial surface on said inner of said ring-like assemblies into engagement with said radial surface on said outer of said ring-like assemblies; and means for circulating a heat exchange fluid through at least a portion of said outer of said ring-like assemblies.

4. In apparatus for processing rubber, plastic and the like, a housing providing a material processing chamber, a rotor having a material processing blade in the processing chamber with at least one end extending outwardly of the processing chamber through an opening in the housing, a seal for preventing leakage or escape of material being processed between the housing and the extension of the rotor through the opening in the housing comprising: two concentric ring-like assemblies for closing the opening in the housing surrounding the rotor, one being orientated radially inwardly of the other; the outer of said ring-like assemblies comprising at least two arcuate parts, means for securing said parts of said outer of said ring-like assemblies to the housing; means for securing the inner of said ring-like assemblies to the rotor; said inner of said ring-like assemblies having a radial surface facing away from the mixing chamber slidably engaging a radial surface on said outer of said ring-like assemblies; means biasing said radial surface on said inner of said ring-like assemblies into engagement with said radial surface on said outer of said ring-like assemblies; and means for circulating a heat exchange fluid through at least a portion of said outer of said ring-like assemblies.

* * * * *